United States Patent [19]

Ramsden et al.

[11] Patent Number: 4,721,573
[45] Date of Patent: Jan. 26, 1988

[54] USE OF SULFONIC DERIVATIVES OF ACYLATED POLYETHYLENEIMINE BONDED PHASE SILICA PRODUCTS

[75] Inventors: Hugh E. Ramsden, Scotch Plains; David R. Nau, Lebanon, both of N.J.

[73] Assignee: J. T. Baker Chemical Company, Phillipsburg, N.J.

[21] Appl. No.: 943,954

[22] Filed: Dec. 22, 1986

Related U.S. Application Data

[63] Continuation-in-part of Ser. No. 837,051, Mar. 6, 1986, Pat. No. 4,661,248.

[51] Int. Cl.$^4$ .............................................. B01D 15/08
[52] U.S. Cl. .................................... 210/635; 210/656; 530/368; 530/413; 530/417
[58] Field of Search .................... 210/635, 656, 198.2, 210/502.1; 55/67, 386; 502/401, 407, 411, 439; 530/413, 417, 368

[56] References Cited

U.S. PATENT DOCUMENTS

| | | | |
|---|---|---|---|
| 3,987,058 | 10/1976 | Saunders | 210/198.2 |
| 4,505,818 | 3/1985 | Mukoyama | 210/198.2 |
| 4,523,997 | 6/1985 | Crane | 210/635 |
| 4,540,486 | 9/1985 | Ramsden | 210/502.1 |
| 4,551,245 | 11/1985 | Ramsden | 210/198.2 |
| 4,606,825 | 8/1986 | Crane | 210/635 |

FOREIGN PATENT DOCUMENTS 5380291  7/1978  Japan .................... 210/198.2

*Primary Examiner*—Ernest G. Therkorn
*Attorney, Agent, or Firm*—Parmelee, Bollinger & Bramblett

[57] ABSTRACT

Sulfonic derivatives of N-acylated covalently bound, non-crosslinked polyethyleneimine bonded phase silicas of the formula:

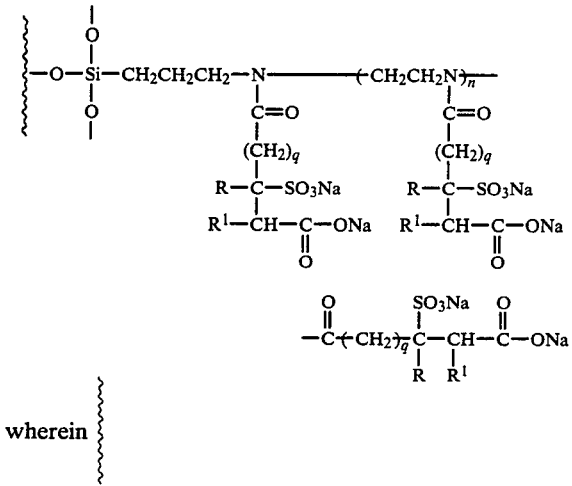

wherein is the backbone of a silica gel or glass, n is an integer such that the polyethyleneiminopropyl silane group has an average molecular weight of from about 400 to about 1800; q is an integer of zero or one; R is selected from the group consisting of hydrogen, $-(CH_2)_xH$ or $-(CH_2)_m COOH$ where x is an integer of 1 or 2 and m is an integer of zero or 1; when R is hydrogen or $-(CH_2)_xH$ then $R^1$ is $-(CH_2)_p$ COOH where p is an integer of zero or 1, and when R is $-(CH_2)_m COOH$ then $R^1$ is selected from the group consisting of hydrogen or $-(CH_2)_yH$ where y is a integer of zero or 1, are especially useful as solid phases for the purification and separation of proteins having isoelectric points of below about 5.

27 Claims, No Drawings

USE OF SULFONIC DERIVATIVES OF ACYLATED POLYETHYLENEIMINE BONDED PHASE SILICA PRODUCTS

RELATED APPLICATION

This Application is a continuation-in-part of copending Application Ser. No. 837,051, filed Mar. 6, 1986, now U.S. Pat. No. 4,661,248.

FIELD OF INVENTION

This invention relates to novel bonded phase silica products, their use in the separation and purification of proteins, especially proteins having an isoelectric point of below about 5, and the preparation of same. More particularly this invention relates to sulfonic derivatives of N-acylated covalently bound, non-crosslinked polyethyleneimine bonded phase silica products, their use as solid phases suitable for column packing in liquid chromatography for the separation and purification of proteins, especially proteins having an isoelectric point below about 5 and the preparation of same.

BACKGROUND OF THE INVENTION

Alpert and Regnier in J. Chromatogr. 185, 375–392 (1979) have shown that polyethyleneimine (PEI) may be adsorbed to silica surfaces, thereby providing sufficient primary and secondary imino groups on adjacent adsorbed PEI molecules to be crosslinked by multifunctional oxiranes into a polymeric layer. Recently, the separation of synthetic oligonucleotides using high-performance liquid chromatography (HPLC) with columns of microparticulate silica coated with crosslinked polyethyleneimine has been reported in the literature by T. G. Lawson et al., Anal. Biochem. 133, 85–93 (1983).

More recently, new non-crosslinked covalently bound polyethyleneiminopropyl trimethoxy silane silica gel (PEI-PrSi-Silica gel) and polyethyleneiminopropyl trimethoxy silane controlled pore glass (PEI-PrSi-CPG) bonded phase products have been described by Hugh Ramsden in his U.S. Pat. No. 4,540,486, issued Sept. 10, 1985, as being useful in the separation and analysis of protein mixtures.

Since Ramsden's non-crosslinked covalently bound PEI-PrSi-Silica gel and PEI-PrSi-CPG products constitute the substrates to be N-acylated in accordance with this invention, the disclosure of said U.S. Pat. No. 4,540,486 is incorporated herein in its entirety by reference thereto.

While said PEI-PrSi-Silica gel and PEI-PrSi-CPG bonded phase products have been found to be quite useful as solid phases for column packing in liquid chromatography for the separation and purification of proteins, these bonded phases products have been found not to be sufficiently strong cation exchangers for certain proteins and therefore separation and purification of such proteins has been rendered difficult or impossible. This has been found to be especially the case for separation and purification of proteins having low isoelectric points, that is, below about 5 or so. For example, said bonded phases do not provide sufficiently acceptable separation and purification of proteins such as ovalbumin and bovine serum albumin, for example.

It is, therefore, highly desirable that solid bonded phase products be provided that will permit suitable separation of proteins having isoelectric points of below about 5 and are strong cation exchangers for certain proteins. Additionally, it is highly desirable that there be provided such solid bonded phase products that are substantially fully charged at various pH's of from 2 and above and which provide a greater degree of selectivity than previously permissible. Moreover, it would be advantageous to provide solid bonded phase products that bind proteins more strongly than heretofore and which provide higher capacity by introducing $SO_3^-$ group adjacent to each $COO^-$ location. Furthermore, it would be highly advantageous that solid bonded phase products be provided that bind proteins with isoelectric points less than 5 due to the sulfonic acid group and also bind proteins with isoelectric points greater than 5 due to the combined binding strengths of both the sulfonic acid and carboxylic acid group.

BRIEF DESCRIPTION OF THE INVENTION

It has now been found that the imino and amino functions of the aforementioned non-crosslinked covalently bound PEI-PrSi-Silica gel and PEI-PrSi-CPG bonded phase products of Ramsden's U.S. Pat. No. 4,540,486 may be N-acylated and the N-acylated reaction products further reacted with a water-soluble bisulfite such as potassium or sodium bisulfite or a water-soluble bisulfite precursor to provide sulfonic derivatives of acylated polyethyleneimine bonded phase silica products which are useful as solid phases for the separation and purification of proteins, especially proteins having a low isoelectric point.

The sulfonic derivatives of acylated polyethyleneimine bonded phase silica products of this invention are of the formula

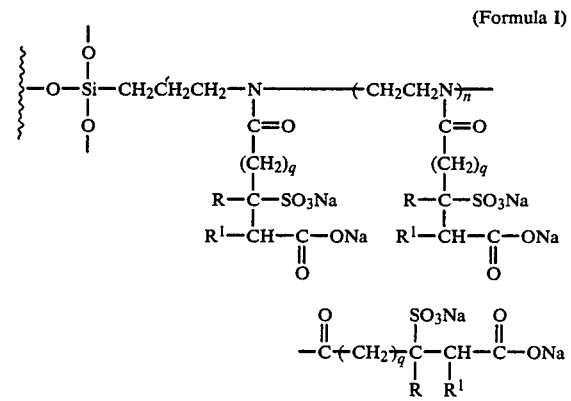

(Formula I)

wherein is the backbone of a silica gel or glass such as controlled pore glass (CPG), n is an integer such that the polyethyleneiminopropyl silane group has an average molecular weight of from about 400 to about 1800; q is an integer of zero or one; R is selected from the group consisting of hydrogen, $-(CH_2)_xH$ or $-(CH_2)_mCOOH$ where x is an integer of 1 or 2 and m is an integer of zero or 1; when R is hydrogen or $-(CH_2)_xH$ then $R^1$ is $-(CH_2)_pCOOH$ where p is an integer of zero or 1, and when R is $-(CH_2)_mCOOH$ then $R^1$ is selected from the group consisting of hydrogen or $-(CH_2)_yH$ where y is an integer of zero or 1.

DETAILED DESCRIPTION OF THE INVENTION

The sulfonic derivatives of this invention are readily prepared from the non-crosslinked covalently bound PEI-PrSi-Silica gel and PEI-PrSi-CPG bonded phase products of the aforementioned U.S. Pat. No. 4,540,486 by N-acylation thereof with an acylating agent which is an acid of the formula

or the acid anhydride or acid halides thereof, wherein q, R and R[1] are as defined in Formula I, to provide N-acylated PEI-PrSi-Silica gel and N-acylated PEI-PrSi-CPG reaction products of the formula

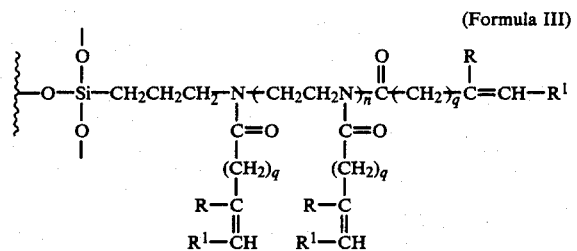

wherein n, q, R and R[1] are as defined in Formula I.

The N-acylated reaction products of Formula III are thereafter reacted with water-soluble bisulfite or a water-soluble bisulfite producing reactant (a sodium bisulfite precursor), such as sodium metabisulfite, in the presence of an oxygen source, to introduce a sulfonic radical on the acyl function and thereby provide the novel sulfonic derivatives of Formula I of this invention.

The percent nitrogen in the PEI-PrSi-Silica gel or PEI-PrSi-CPG reactant substrates which is readily determinable by conventional elemental analysis, is indicative of the relative combined total of imino and amino functions on the PEI moiety. Sufficient acylating agent is used to react with substantially all the imino and amino functions on the PEI moiety. In general, the N-acylation step is readily accomplished with an equivalent amount or slight excess of the acylating agent in an inert aprotic organic solvent. Typical aprotic solvents include an aromatic hydrocarbon such as, for example, benzene, toluene, xylene and the like; an ether such as tetrahydrofuran, dioxane and the like, and an aliphatic hydrocarbon such as hexane, heptane and the like. An equivalent amount or slight excess of an acid scavenger such as, for example, a tertiary amine, preferably a tertiary alkyl amine, can be advantageously employed to pick up the acid released during the acylation reaction when acyl halides are used.

Typical acylating agents include acids and the acid anhydrides and acid halides, particularly acid chlorides, of the acids of Formula II such as, for example, maleic, fumaric, mesaconic, citraconic, glutaconic, itaconic acid and the like. Especially preferred as acylating agents are the anhydrides of these acids, particularly maleic anhydride.

Accordingly, this invention first provides a non-crosslinked polyethyleneimine (PEI) function covalently bound to silica gel or glass by way of a propylsilyl (PrSi) linkage wherein substantially all, i.e. more than 80% and, preferably, more than 95% of the imino and amino functions of the PEI moiety are acylated with an acyl function, which acyl functions are then reacted with a bisulfite producing reactant to provide the novel sulfonic derivatives of this invention.

Reaction of N-acylated PEI-PrSi-Silica gel and N-acylated PEI-PrSi-CPG reaction products with bisulfite or a bisulfite precursor is conducted in the presence of an oxygen source such as oxygen, air, potassium persulfate, benzoyl peroxide and the like.

The silica gel and glass forming the backbone of the solid phase bonded silica products of this invention is silica gel having an average particle diameter of from about 1 to about 70 microns and an average pore size of from about 0, preferably about 50, to about 1000 Angstrom units, or glass, preferably particulate controlled pore glass having an average particle diameter of from about 37 to about 177 microns and an average pore size of from about 0, preferably about 40, to about 1000 Angstrom units, with polyethyleneiminopropyl trimethoxy silane having an average molecular weight of from about 400 to about 1800.

The sulfonic derivatives of N-acylated PEI-PrSi-Silica gel or PEI-PrSi-CPG bonded phase products of Formula I constitute new and useful bonded phases for the purification and separation of proteins by column chromatography and are particularly suitable with modern HPLC instrumentation. The packing may be of various mesh sizes, for example, from about 50 to about 600 mesh.

The preferred sulfonic derivatives of N-acylated PEI-PrSi-Silica gel bonded phase products of Formula I are those obtained from the reaction product of particulate silica gel having an average particle diameter of from about 5 to about 40 microns and an average pore size of from about 50 to about 330 Angstrom units and polyethyleneiminopropyl trimethoxy silane having an average molecular weight of from about 400 to about 600; and those obtained from particulate silica gel having an average particle diameter of from about 40 to about 62 microns and an average pore size of from about 250 to about 500 Angstrom units and polyethyleneiminopropyl trimethoxy silane having an average molecular weight of about 1000.

It is believed that the subject sulfonic derivatives of N-acylated PEI-PrSi-Silica gel and PEI-PrSi-CPG bonded phase products of Formula I separate proteins on the basis of both weak and strong ionic interaction. The marked advantages in separating proteins with the subject products are deemed surprising and unusual since presently available chromatographic matrixes that separate on this basis generally give broad peaks with poor selectivity, have poor stability, low capacity and give non-quantitative recovery of proteins. In contrast, the chromatographic matrixes of this invention provide sharp well-defined peaks with good selectivity are highly stable, have high capacity and exhibit quantitative recovery of both protein mass and, in the case of enzyme separation, without significant loss of enzyme activity.

Moreover, with the novel bonded phase products of this invention changes in buffer composition and changes in buffer pH allows for changes in the relative elution profiles of various protein mixtures.

The present invention is even more surprising since one would normally expect the herein described chromatographic matrixes to be hydrolytically unstable in aqueous high ionic strength mobile phases used for hydrophobic interaction chromatography due to the inherent solubility characteristics of silica in such high ionic strength aqueous solutions. Thus, one would normally expect that the use of silica bases matrixes would necessarily result in short column lifetimes. The opposite, however, is true with the subject sulfonic derivatives of N-acylated PEI-PrSi-Silica gel and PEI-PrSi-CPG bonded phase products of Formula I.

Additionally, the sulfonic derivatives of the N-acylated PEI-PrSi-Silica gel and PEI-PrSi-CPG bonded phas products of Formula I have the advantage of offering a greater degree of selectivity in protein separation and purification binding proteins more strongly and offering higher capacity for columns in which they are used as packings. Moreover, these products of Formula I are substantially fully charged at pH's of from about 2 and above and are sufficiently strong cation exchangers that they can be readily used to separate and purify proteins having low isoelectric points, that is of below about 5 or so, particularly proteins such as ovalbumin and bovine serum albumin and the like.

Another advantage offered by the bonded phase products of Formula I is that such bonded phases readily permit change of pH of the buffer system employed in the protein separation and purification steps.

The N-acylated PEI-PrSi-Silica gel and N-acylated PEI-PrSi-CPG reaction products of Formula III also are new bonded phase products which find utility as intermediates for the preparation of the sulfonic derivatives of Formula I.

In the following examples PEI-PrSi-Silica gel and PEI-PrSi-CPG, prepared as in the following Preparations, are employed as the starting reactants and it will be appreciated that said reactant is merely exemplary and that other PEI-PrSi-Silica gels or PEI-PrSi-CPG bonded phases, in accordance with the foregoing description and the disclosure in the aforementioned U.S. Pat. No. 4,540,486, could be employed in accordance with the following examples to provide other sulfonic derivatives of Formula I of this invention.

PREPARATION A

PEI-PrSi-Silica Gel

To 100 grams silica gel with an average particle diameter of 40 microns and an average pore size of 250 Angstroms, 500 ml propanol and 49.5 grams (47.1 ml) polyethyleneiminopropyl trimethoxysilane having an average molecular weight of about 500 is added with stirring and the mixture allowed to stand at room temperature for about 48 hours. The reaction mixture is next vacuum filtered and the filtrate washed twice with 400 ml portions of 2-propanol and twice with 400 ml portions of methanol and then oven dried at about 80° C. for about four hours. The product was reslurried in 500 ml deionized water and again filtered and washed with methanol several times and then oven dried for a second time at about 80° C. for about 4 hours to yield about 95.5 grams of covalently bound PEI-PrSi-Silica gel product. Analysis: 5.08% C, 1.43% H and 2.22% N.

PREPARATION B

PEI-PrSi-Silica Gel

To 100 grams silica gel having an average particle diameter of about 5.25 microns and an average pore size of about 330 Angstroms is added 500 ml toluene, 2 ml water and 50 ml of a 50% w/w isopropanolic solution polyethyleneiminopropyl trimethoxy silane having as average molecular weight of about 500 and the mixture stirred and permitted to stand at room temperature for about 48 hours. The mixture is then filtered and the filtrate washed twice with 500 ml portions of toluene and twice with 500 ml portions of methanol and then dried in an oven at about 80° C. for about 2 hrs. 45 minutes. The product was reslurried in water, filtered, washed with water and methanol and oven dried again at about 80° C. for about 1½ hour. Yield: 93.0 grams. Analysis: 3.31% C, 1.30% H and 1.25% N.

PREPARATION C

PEI-PrSi-CPG

To a slurry of 10 grams controlled pore glass with average particle diameter of 125 microns and average pore size of 240 Angstroms in 50 ml hexane is added 19.71 grams of a 50% w/w isopropanolic solution of polyethyleneiminopropyl trimethoxy silane having an average molecular weight of 500. The mixture is stirred for 5 minutes at room temperature and then heated to reflux temperature for about 2 hours. The mixture is allowed to cool to room temperature, filtered and washed with 50 ml hexane twice and 50 ml methanol twice. The filtrate is then oven dried at about 80° C. for about 3 hours to yield the covalently bonded, non-crosslinked PEI-PrSi-CPG product.

The following examples are presented to illustrate and exemplify this invention.

EXAMPLE 1

To 50 grams of PEI-PrSi-Silica gel product of Preparation A in 250 mls toluene is added 20 grams maleic anhydride with stirring. The reaction mixture is heated at about 65° C. for 4½ hours. The reaction product is filtered, washed thrice with methanol and then oven dried at about 80° C. for about 1½ hours. Yield: 57.7 grams; Analysis: 8.78% C, 1.47% H, 2.13% N, titre: 0.65 meq/gram. Twenty grams of this reaction product and 13 ml of 1N NaOH are then mixed with 9.5 grams sodium metabisulfite in 100 ml H$_2$O and mixed thoroughly. The reaction mixture is placed in a hot bath at about 80° C., open to the air, for a period of about 6 hours. The reaction product is filtered, washed successively twice with water and twice with methanol and placed in an oven at about 80° C. for a period of about 3½ hours to dry. Yield: 20.62 grams; Analysis: 7.26% C, 1.56% H, 1.94% N, 2.03% S; 0.634 meq/g sulfonic acid.

EXAMPLE 2

The procedure of Example 1 is repeated except that 50 grams of the PEI-PrSi-Silica gel product of Preparation B is substituted for the PEI-PrSi-Silica gel product of Preparation A to yield the corresponding sulfonic bonded phase N-acetylated PEI-PrSi-Silica gel derivative.

EXAMPLE 3

The procedure of Example 1 is repeated except that an equivalent quantity of the PEI-PrSi-CPG product of Preparation C is substituted for the PEI-PrSi-Silica gel product of Preparation A to yield the corresponding sulfonic derivative of N-acylated PEI-PrSi-CPG bonded phase.

EXAMPLE 4

The procedure of Example 1 is repeated except that an equivalent quantity of citraconic acid anhydride is substituted for the maleic acid anhydride to yield the corresponding sulfonic derivative of N-acylated PEI-PrSi-Silica gel bonded phase.

EXAMPLE 5

The procedure of Example 1 is repeated except that an equivalent quantity of glutaconic acid anhydride is substituted for the maleic acid anhydride to yield the corresponding sulfonic derivative of N-acylated PEI-PrSi-Silica gel bonded phase.

EXAMPLE 6

The procedure of Example 1 is repeated except that a equivalent quantity of itaconic acid anhydride is substituted for the maleic acid anhydride to yield the corresponding sulfonic derivative of N-acylated PEI-PrSi-Silica gel bonded phase.

EXAMPLE 7

A standard analytical column (4.6 mm internal diameter×250 mm length) is slurry packed at high pressure (7500 psi) with sulfonic derivative of PEI-PrSi-Silica gel (about 40 microns; about 250 Angstroms) obtained from Example 1 as the bonded phase. The slurry consists of 3.0 grams of the sulfonic derivative of PEI-PrSi-Silica gel in 25 mls methanol. After pumping the slurry into the column, an additional 100 mls methanol are then pumped through the column at the same pressure. The column is attached to a high pressure liquid chromatograph and a solution of 500 millimolar NaOAC, pH 7, is pumped through the column at 1 ml/min. at 1200 psi flow rate until a steady baseline is observed at 280 nm. A solution of 25 millimolar $KH_2PO_4$, pH 6, is then pumped at about the same flow rate through the column until a steady baseline is achieved. A solution (100 microliters) of a protein mixture dissolved in the low salt buffer A, made up of 25 mM $KH_2PO_4$, is injected into the column and the protein components are eluted by increasing the salt concentration to 500 mM NaOAC, pH 7 (buffer B) over 30 minutes at 1 ml/min. The mixture of proteins included 500 micrograms of cytochrome C; 500 micrograms of hemoglobin; 500 micrograms of lysozyme and 500 micrograms of ovalbumin. Each protein elutes as a concentrated band, well separated from each other. Typical mass recoveries for the individual proteins were greater than ninety percent of the original amount, for example, 97% of cytochrome C, 96% of hemoglobin, 95% of lysozyme and 95% of ovalbumin. The column of this example does not demonstrate any significant loss in chromatographic performance even after 1000 hours of chromatographic use for protein separation.

EXAMPLE 8

A standard analytical column (4.6 mm internal diameter×250 mm length) is slurry packed at high pressure (7500 psi) with sulfonic derivative of PEI-PrSi-Silica gel (about 40 microns; about 300 Angstroms) obtained from Example 1 as the bonded phase. The slurry consists of 3.0 grams of the sulfonic derivative of PEI-PrSi-Silica gel in 25 mls methanol. After pumping the slurry into the column, an additional 100 mls methanol are then pumped through the column at the same pressure. The column is attached to a high pressure liquid chromatograph and a solution of 500 millimolar NaOAC, pH 7, is pumped through the column at 1 ml/min. at 1200 psi flow rate until a steady baseline is observed at 280 nm A solution of 25 millimolar $KH_2PO_4$, pH 6, is then pumped at about the same flow rate through the column until a steady baseline is achieved. A solution (100 microliters) of a hybridona cell culture media diluted 4 fold in the low salt buffer A, made up of 25 mM $KH_2PO_4$, is injected into the column and the protein components are eluted by increasing the salt concentration to 500 mM NaOAC (buffer B) over 60 minutes at 1 ml/min. The antibody is eluted at >80% purity later in the gradient than any other protein constituent.

What is claimed is:

1. In a solid phase extraction process for the purification and separation of protein from a sample the improvement comprising employing as the solid phase a sulfonic derivative of covalently bound, non-crosslinked polyethyleneimine bonded phase silica of the formula

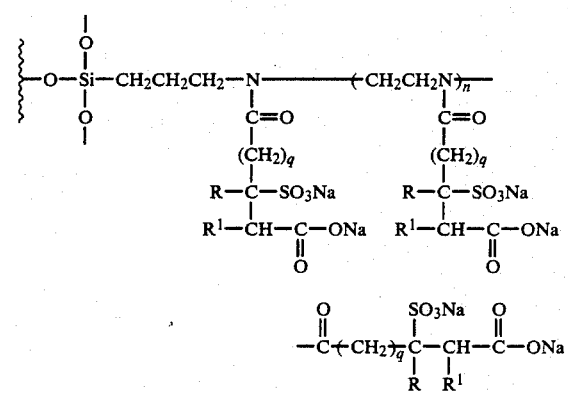

wherein is the backbone of a silica gel or glass, n is an integer such that the polyethyleneiminopropyl silane group has an average molecular weight of from about 400 to about 1800; q is an integer of zero or one; R is selected from the group consisting of hydrogen, $+CH_2)_{\overline{x}}H$ or $+CH_2)_{\overline{m}}COOH$ where x is an integer of 1 or 2 and m is an integer of zero or 1; when R is hydrogen or $+CH_2)_{\overline{x}}H$ then $R^1$ is $+CH_2)_{\overline{p}}COOH$ where p is an integer of zero or 1, and when R is $+CH_2)_{\overline{m}}COOH$ then $R^1$ is selected from the group consisting of hydrogen or $+CH_2)_{\overline{y}}H$ where y is an integer of zero or 1.

2. A process according to claim 1 wherein the silica backbone of the bonded phase is selected from particulate silica gel having an average particle diameter of from about 3 to about 70 microns and an average pore size of from about 50 to about 1000 Å or particulate controlled pore glass having an average particle diameter of from about 37 to about 177 microns and an average pore size of from about 40 to about 1000 Å.

3. A process according to claim 2 wherein the silica backbone of the bonded phase is particulate silica gel having an average particle diameter of from about 3 to about 70 microns and an average pore size of from about 50 to about 1000 Å.

4. A process according to claim 3 wherein q=zero, R is hydrogen, $R^1$ is $+CH_2)_{\overline{p}}COOH$ and p is zero.

5. A process according to claim 3 wherein q is zero, R is $+CH_2)_{\overline{x}}H$, x is 1, $R^1$ is $+CH_2)_{\overline{p}}COOH$ and p is zero.

6. A process according to claim 3 wherein q is 1, R is hydrogen, $R^1$ is $+CH_2)_{\overline{p}}COOH$ and p is zero.

7. A process according to claim 3 wherein q is zero, R is $+CH_2)_{\overline{m}}COOH$, m is 1 and $R^1$ is hydrogen.

8. A process according to claim 2 wherein the particulate silica gel has an average particle derivative of from about 5 to about 40 microns and an average pore size of from about 50 to about 330 Å, an n is an integer such that the polyethyleneiminopropyl silane moiety has an average molecular weight of from about 400 to about 600.

9. A process according to claim 2 wherein the particulate silica gel has an average particle derivative of from about 40 to about 62 microns and an average pore size of from about 210 to about 520 Å, an n is an integer such that the polyethyleneiminopropyl silane moiety has an average molecular weight of from about 1000.

10. In a solid extraction process for the purification and separation of proteins having an isoelectric point of below about 5 the improvement comprising employing as the solid phase a sulfonic derivative of covalently bound, non-crosslinked polyethyleneimine bonded phase silica of the formula

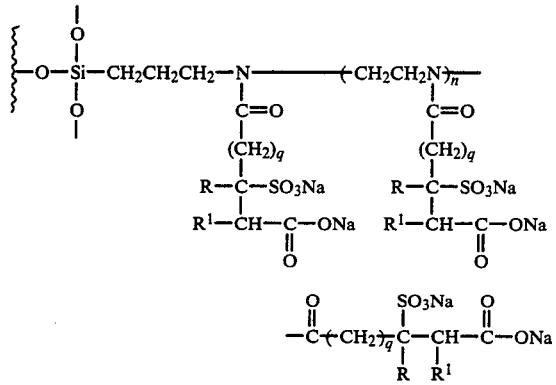

wherein is the backbone of a silica gel or glass, n is an integer such that the polyethyleneiminopropyl silane group has an average molecular weight of from about 400 to about 1800; q is an integer of zero or one; R is selected from the group consisting of hydrogen, $+CH_2)_xH$ or $+CH_2)_m COOH$ where x is an integer of 1 or 2 and m is an integer of zero or 1; when R is hydrogen or $+CH_2)_xH$ then $R^1$ is $+CH_2)_pCOOH$ where p is an integer of zero or 1, and when R $+CH_2)_mCOOH$ then $R^1$ is selected from the group consisting of hydrogen or $+CH_2)_yH$ where y is an integer of zero or 1.

11. A solid extraction process according to claim 10 wherein the silica backbone of the bonded phase is selected from particulate silica gel having an average particle diameter of from about 3 to about 70 microns and an average pore size of from about 50 to about 1000 Å or particulate controlled pore glass having an average particle diameter of from about 37 to about 177 microns and an average pore size of from about 40 to about 1000 Å.

12. In a solid extraction process according to claim 11 wherein the silica backbone of the bonded phase is particulate silica gel having an average particle diameter of from about 3 to about 70 microns and an average pore size of from about 50 to about 1000 Å.

13. In a solid extraction process according to claim 12 wherein q=zero, R is hydrogen, $R^1$ is $+CH_2)_pCOOH$ and p is zero.

14. A solid phase extraction process according to claim 13 for the purification and separation of a protein selected from ovalbumin and bovine serum albumin.

15. In a solid extraction process according to claim 12 wherein q is zero, R is $+CH_2)_xH$, x is 1, $R^1$ is $+CH_2)_pCOOH$ and p is zero.

16. A solid phase extraction process according to claim 15 for the purification and separation of a protein selected from ovalbumin and bovine serum albumin.

17. In a solid extraction process according to claim 12 wherein q is 1, R is hydrogen, $R^1$ is $+CH_2)_pCOOH$ and p is zero.

18. A solid phase extraction process according to claim 17 for the purification and separation of a protein selected from ovalbumin and bovine serum albumin.

19. In a solid extraction process according to claim 12 wherein q is zero, R is $+CH_2)_mCOOH$, m is 1 and $R^1$ is hydrogen.

20. A solid phase extraction process according to claim 19 for the purification and separation of a protein selected from ovalbumin and bovine serum albumin.

21. A solid phase extraction process according to claim 12 for the purification and separation of a protein selected from ovalbumin and bovine serum albumin.

22. In a solid extraction process according to claim 11 wherein the particulate silica gel has an average particle derivative of from about 5 to about 40 microns and an average pore size of from about 50 to about 330 Å, an n is an integer such that the polyethyleneiminopropyl silane moiety has an average molecular weight of from about 400 to about 600.

23. A solid phase extraction process according to claim 22 for the purification and separation of a protein selected from ovalbumin and bovine serum albumin.

24. In a solid extraction process according to claim 11 wherein the particulate silica gel has an average particle derivative of from about 40 to about 62 microns and an average pore size of from about 210 to about 520 Å, an n is an integer such that the polyethyleneiminopropyl silane moiety has an average molecular weight of from about 1000.

25. A solid phase extraction process according to claim 24 for the purification and separation of a protein selected from ovalbumin and bovine serum albumin.

26. A solid phase extraction process according to claim 11 for the purification and separation of a protein selected from ovalbumin and bovine serum albumin.

27. A solid phase extraction process according to claim 10 for the purification and separation of a protein selected from ovalbumin and bovine serum albumin.

* * * * *